UNITED STATES PATENT OFFICE.

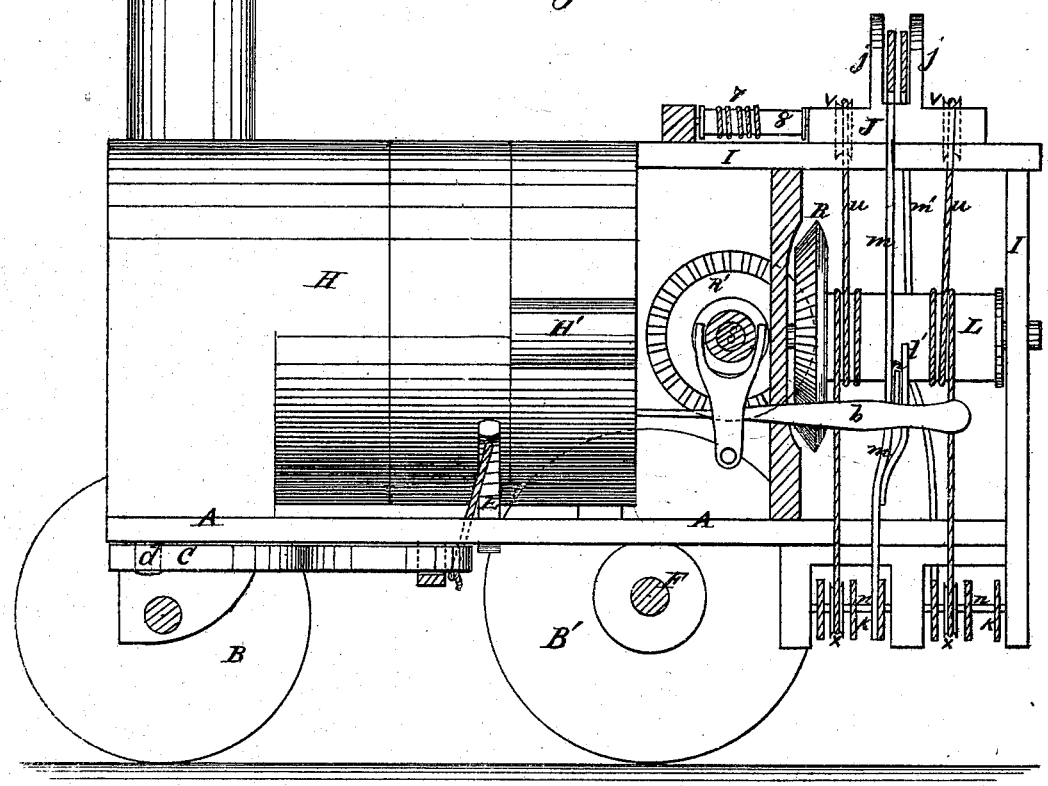

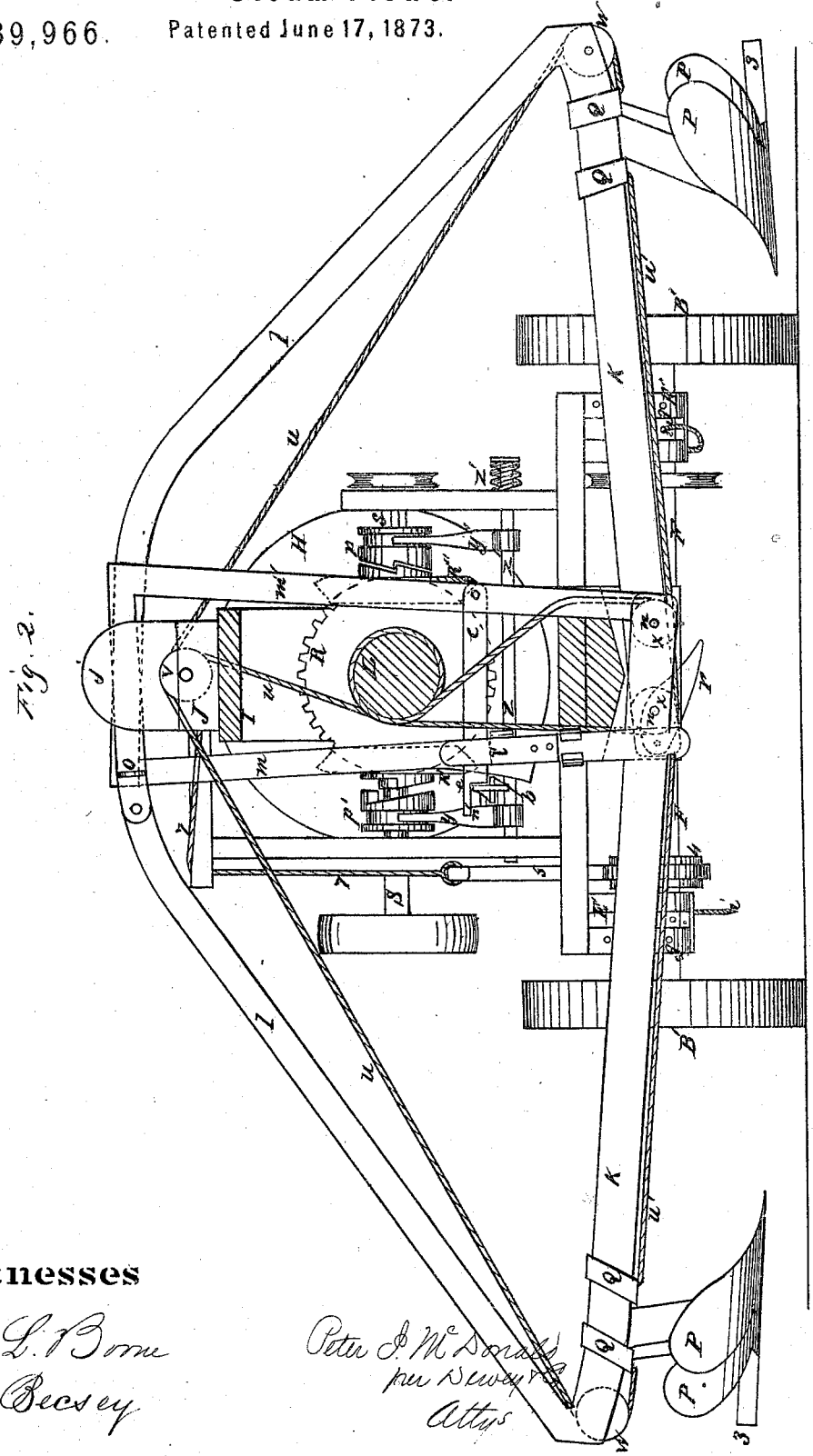

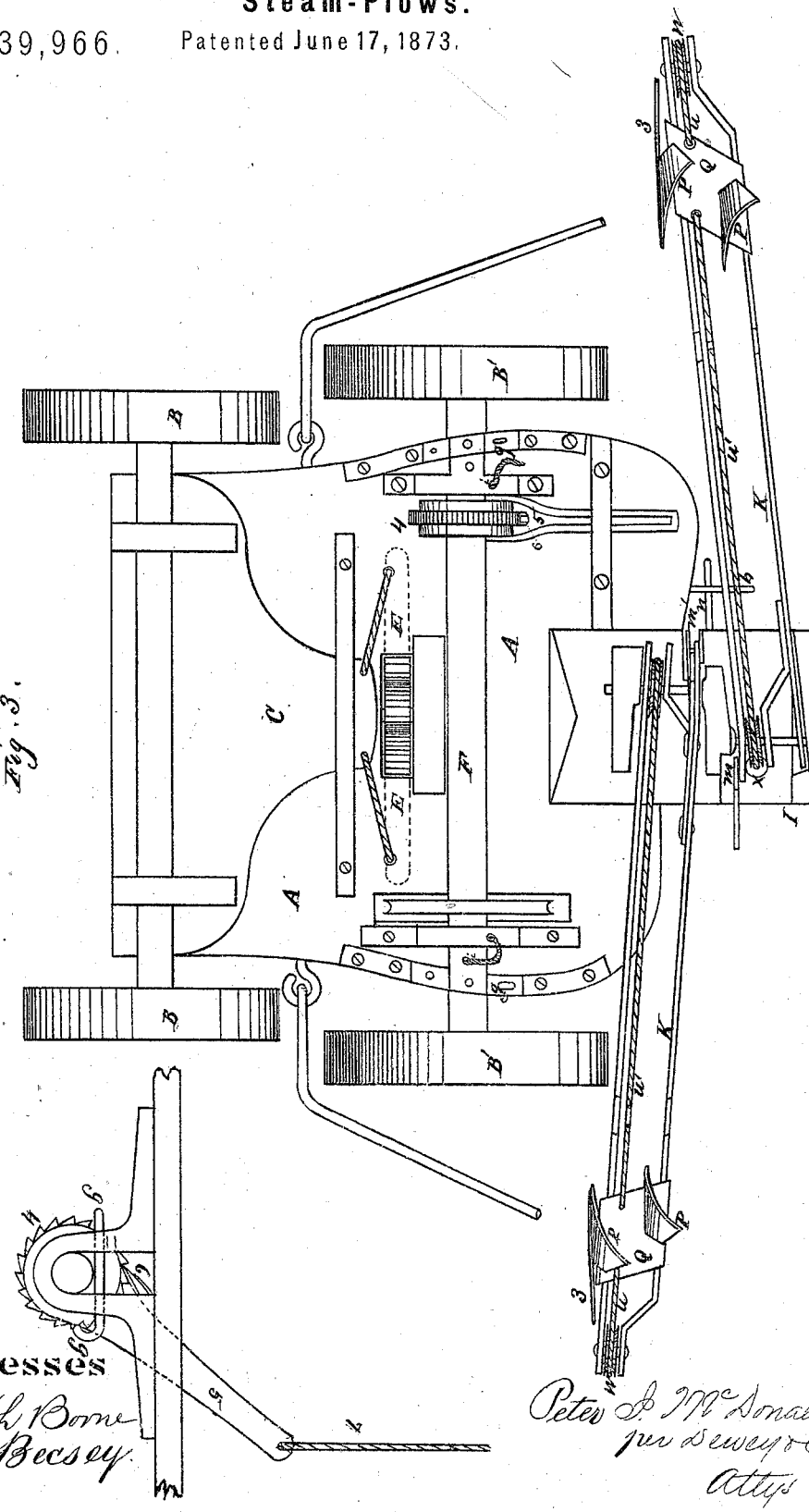

PETER J. McDONALD, OF SAN FRANCISCO, CALIFORNIA.

IMPROVEMENT IN STEAM-PLOWS.

Specification forming part of Letters Patent No. 139,966, dated June 17, 1873; application filed March 15, 1873.

*To all whom it may concern:*

Be it known that I, PETER J. MCDONALD, of San Francisco city and county, State of California, have invented an Improved Steam-Plow; and I do hereby declare the following description and accompanying drawings are sufficient to enable any person skilled in the art or science to which it most nearly appertains to make and use my said invention or improvement, without further invention or experiment.

My invention relates to a novel arrangement of plowing apparatus, which is connected with and operated by steam-power located upon a wagon. The plows are suspended from long guides or ways which extend to each side of the wagon at right angles, or nearly so, to the travel of the machine, so that the plows upon the opposite sides of the machine will move toward each other when plowing and travel from each other in order to pass back into position to make another cut. The operating mechanism is so constructed and arranged that the proper movements of the plows will be accomplished automatically while the main driving-shaft is revolved uniformly in one direction. The feed of the plows will be accomplished by the slow movement forward of the wagon to which the plowing apparatus is connected; and this will either be accomplished by the draft of the plows or by a lever-and-pawl attachment operated by the engine.

In order to explain my invention so that others will be able to understand its construction and operation, reference is had to the accompanying drawings forming a part of this specification, in which—

Figure 1, Sheet 1, is a longitudinal sectional elevation of my machine. Fig. 2, Sheet 2, is a rear-end view. Fig. 3, Sheet 2, is a bottom view. Fig. 4, Sheet 3, is a detailed view of the pawl and ratchet for propelling the machine ahead while working.

A represents a wagon, which is supported by four broad-faced bearing-wheels B B B' B'. A short platform, C, is secured to the forward axle; and upon this platform the forward end of the wagon-floor is supported. A single bolt or pin, $d$, connects the platform C with the wagon-floor at the forward end, while the rear end of the platform extends back underneath the floor to near its middle, where ropes or chains extend a short distance each way toward the sides of the wagon, where they pass up through the floor and are attached to the opposite ends of a bow-shaped lever, E, which is placed transversely across the floor, and whose curved middle is pivoted to the floor midway between the ropes, so that by raising or lowering either end of the bow-shaped lever E the cords or ropes will shift the rear end of the platform toward either side, and thus cramp the forward wheels so as to steer the wagon. The wheels B' B' revolve freely on the journals of the rear axle F', and the boxes E' in which the rear axle rests are slotted vertically, as shown, so that the rear end of the floor can be raised or lowered when desired. This adjustment is accomplished by a string, rope, or chain, $g$, which is secured to the lower end of each of the boxes, to the opposite extremity of which a pin, $i$, is secured. This pin is inserted in a hole in the axle, so that the forward travel of the machine will wind the rope or chain around the axle and draw it down in the slot, or, rather, raise the wagon to the desired point, where it can be held by means of bolts or pins $g$, which are passed through holes in the opposite sides of the boxes so as to support the wagon upon the axles at any required part of the slot. The boiler H is located upon the floor of the wagon, and may be either a horizontal or upright boiler. H' H' are the two cylinders, one located upon each side of the boiler. At the rear of the wagon I erect a frame, I, which is properly braced and strengthened and which extends back a short distance from the wagon. Upon the upper cross-timber of the frame is fixed a casting, J, having two parallel flanges $j\,j$ extending upward from it. K K are two parallel ways which extend out upon each side of the wagon from underneath the frame I. These ways form the lower or horizontal side of two rigid triangular frames, which are supported by the frame I. The angular guy or brace $l$ of each of these triangular frames extends from the outer extremity of the ways up over the top of the frame I between the flanges $j\,j$, and the upper extremities of the two frames are connected with the inner end of the ways on opposite sides of the frame by vertical bars or plates $m$ $m'$. The inner ends of the triangular frame overlap each other, so that the vertical bars $m$ $m'$ of the two frames will come on opposite sides of the frame I, as shown. The lower inside angle of each of the frames is confined between two downward-projecting ledges, and a bolt fastening, $n$, serves as a shaft or journal about which the triangular frames can move. This movement of the triangular frames is limited by the upright bar $m$ striking the upper cross-timber of the frame I upon one side, while a projection, $o$, on the angular braces $l$ serves to limit the opposite motion or elevation of the outer end of the guide bars, or the movement can be limited by a gage-wheel on the outer side of the frame. P P are two plows, the standards of which are secured at their upper ends to the slides Q. These slides Q move along the ways K K of the two triangular frames, and their points are directed toward each other, so that they will plow in opposite directions. The inside plow of each gang only is provided with a land-side, thus preventing them from disturbing the furrows as they are drawn to the outer ends of the ways, and permitting them to be placed side by side in the gang. L is a large drum, which is mounted upon journals inside of the frame I, in line with the wagon, so as to revolve between the two upright bars $m$ of the triangular frames. A large bevel-wheel, R, is secured to the inner end of this drum, which engages with the bevel-wheels $R'$ $R''$ on the main driving-shaft S, which is supported in bearings transversely to the drum L. The bevel-wheels $R'$ $R''$ are loose upon the transverse shaft. Clutches $p$ slide on a feather upon the shaft outside of these wheels $R'$ $R''$, and serve, when thrown into gear, to drive the bevel-wheel R either right or left, according to the side which is engaged, thus providing a reversing-gear for giving the drum L alternate rotary motion. A cord, rope, or chain, $u$, has one end fixed to the drum L, and is wound several times around it; thence it passes up over a pulley, $v$, in the casting J above, from whence it is carried to the outer end of the ways K K, where it passes over a pulley, W, and to the slide Q, to which its opposite end is attached. Another cord, $w'$, is secured to the opposite side of the slide, and extends to the inner end of the ways K K beneath the frame I, where it passes over a pulley, $x$, and thence is carried in an opposite direction around the drum L, to which it is also fastened. Thus it will be seen that by revolving the drum L one of these ropes will be wound up while the other is let off of the drum, thus drawing the slide Q with it, plows in either direction, according to the direction in which the drum is revolved. A duplicate set of cords or ropes are used upon the opposite side of the machine for operating the plows along the ways of the opposite triangular frame, so that by revolving the drum L in one direction both gangs of plows will be drawn from the other end of the ways to the inner end, when by reversing the movement of the drum they will be drawn back again to the other end. The clutches are operated by forked arms $y$ $y'$, which are secured to a transverse sliding rod, $z$, directly below the main driving-shaft S. The sliding rod is kept in position by a spring, $z'$, at one end, to cause the arm $y$ to keep the clutch $p$ engaged with the bevel-wheel $R'$ while the clutch $p'$ is disengaged from the opposite bevel-wheel. A spring-lever, $b$, has one end firmly fixed to the end of the boiler, and extends out past the operating-arm $y$, and also past the upright bar $m$ of the triangular frame. A latch, $e$, has one end hinged or riveted to the vertical arm $m'$ of the opposite triangular frame, so that it can rise and fall freely. This latch is supported in a horizontal position by the plates $l'$ on the vertical bar $m$, and has on its end a catch, $n'$, formed on its under side, so that when the outer extremity of the triangular frame, to which the upright vertical arm $m'$ belongs, is raised the latch is drawn back, so that the catch $n'$ engages with the spring-lever $b$, and the drop or weight of the triangular frames coming upon the latch and lever disengages the bevel-wheel $R'$ and throws the opposite clutch into gear with the bevel-wheel $R''$, thus reversing the movement of the drum, while the lift upon the opposite triangular frame frees the lever from the latch after the plows have been hauled to the outer ends of the ways, thus again reversing the drum. A trip-lever, $r$, is secured at the inner end of one of the ways K K, against which the slide Q, which carries the plows, will strike when the plows are drawn closely up to the center, and which, when thus tripped will, by means of a connecting rod, $l'$, lift the latch $e$, so as to release the spring-lever and allow the spring $z'$ to draw the spring-rod $z$ in an opposite direction, and thus cause the bevel-wheel $R'$ to engage with the bevel-wheel R, at the same time releasing the clutch from the bevel-wheel $R''$, thus reversing the motion of the drum and drawing the plows to the outer end of the ways K K.

The wagon with its plowing attachment can be moved along a road or over a field in the same manner that a traction-engine is driven, during which period the bevel-wheels $R'$ $R''$ will both be disengaged from the bevel-wheel R, and the power transmitted from the main driving-shaft S to the rear axle of the wagon by means of belts and pulleys or other suitable connections.

Upon arriving upon the ground to be plowed the rear end of the wagon is lowered, and the bevel-gear connections adjusted; power is then applied to the driving-shaft and the gangs of plows caused to move back and forth along the ways, plowing a furrow as they move toward each other; and as the rope is drawn upon to haul them back to the outer extremity of the ways the tension upon the ropes $u$ lifts the outer ends of the triangular frames, so that the plows will be lifted high enough to move back without touching the ground, the operation of reversing the movement of the drum being performed automatically. When the plows arrive at the outer ends of the ways the triangular frame lowers, so as to let the plows in the ground again as soon as the tension of the rope is slackened.

A rope, 7, being attached to the end of the lever and carried up around a small drum, 8, which is revolved by a chain and pulley on its extremity, which is driven by the rope or cord $u$, draws the plow to the other end of the ways.

In a large-sized working machine the ways should extend from twenty to thirty feet each way from the frame I, so as to cut a land of from forty to sixty feet in width as the wagon advances. Any number of ways, corresponding with the number of plows to be employed, may be added. The inner ends of the ways K K overlap so that the plows will pass each other without interfering, and thus leave no unplowed ridge between them.

These minor points, however, will readily suggest themselves to the skilled mechanic in the construction of the machine.

By this means I provide a steam plow in which the power of the engine is directed almost solely to the dragging of the plows through the ground, forming a combination of the Fowler or English system and the American plan of drawing the plows along after the machine. The wagon when moving from place to place will travel in an opposite direction to that in which it moves while plowing. The plowing attachment can be detached when not necessary, and the steam-wagon used for the various farm purposes for which steam traction-wagons are generally used.

Having thus described my invention, what I claim, and desire to secure by Letters Patent, is—

1. The slotted boxes E' in combination with the cords or chains $g$, pins $i$, and axle F, having holes for the reception of said pins, substantially as and for the purpose set forth.

2. The frame I, with its casting J, having the parallel flanges $j\ j$, and arranged to support one or more ways or pairs of ways K K, substantially as set forth.

3. The slides Q, having, with their plows P P, a reciprocating motion, in combination with the horizontal ways K K, ropes or chains $u\ u'$, and reversible drum L, substantially as described and for the purpose set forth.

4. The sliding rod $z$, with its operating-arms $y\ y'$ kept in place by the spring $z'$, in combination with the spring-lever $b$, latch $e$, with its catch $n'$ and trip-lever $l'$, the whole operated by the slide Q, substantially as set forth.

5. The reversing-gear, consisting of the bevel-wheels R R' R'', in combination with the clutches $p\ p'$, when operated by the weight of the triangular frames K $l\ m$ by means of the latch $e$ and spring-lever $b$, as and for the purpose set forth.

6. The ratchet-wheel 4, in combination with the lever 5 with its pawl 6, when operated by the rope 7 and drum 8, for the purpose described.

In witness whereof I hereunto set my hand and seal.

PETER JOHN McDONALD, [L. S.]

Witnesses:

JOHN L. BOONE,
JOS. BOOSEY.